INVENTORS
ALEX W. DREYFOOS, JR.
GEORGE W. MERGENS
BY Curtis Ailes
ATTORNEY

United States Patent Office 3,441,663
Patented Apr. 29, 1969

3,441,663

NON-LINEAR AMPLIFIERS AND SYSTEMS

Alex W. Dreyfoos, Jr., Port Chester, N.Y., and George W. Mergens, Wilton, Conn., assignors to Photo Electronics Corporation, Byram, Conn., a corporation of New York Filed Dec. 10, 1965, Ser. No. 512,844
Int. Cl. H04n 1/46, 5/38, 5/44
U.S. Cl. 178—5.2 16 Claims

ABSTRACT OF THE DISCLOSURE

An adjustable gain characteristic amplifier which is particularly useful in combination in electronic viewer systems for providing a positive pictorial representation of a photographic negative, the amplifier including a controllable current carrying device (144, FIG. 2) with at least one slope adjustment circuit 158 connected in parallel with one electrode thereof. The slope adjustment circuit includes a diode, a variable resistor, and a separate adjustable regulated voltage source connected in series circuit relationship.

This invention relates to non-linear amplifiers, and particularly to amplifiers having adjustable non-linear features to obtain various desired non-linear amplifier gain characteristics.

In many applications of electrical and electronic circuits, elements having non-linear characteristics are encountered for which compensation must be made. This problem is encountered for instance in apparatus employing cathode ray tubes, and particularly in color television systems for display of color pictures.

Accordingly, it is an object of the present invention to provide an amplifier having a non-linear gain characteristic which may be adjusted to compensate for other non-linear system components.

It is another object of the present invention to provide an amplifier having gain characteristics which are adjustable to compensate for non-linearities in the output of a cathode ray tube.

Another important instance of non-linear response requirements is encountered in electronic viewers for photographs, and particularly in such viewers which are intended for the purpose of obtaining print exposure data. This is particularly important with color viewers intended for obtaining print exposure information for the accurate and pleasing production of color prints from either negative or positive color masters which may not have proper color balance. A system of this kind is disclosed and claimed, for instance, in our co-pending patent application Ser. No. 453,144 for an Electronic Color Viewer, filed May 4, 1965, and assigned to the same assignee as the present application. In that patent application, a system is disclosed in which optical signals from a master negative or print are converted to electrical signals, amplified under separate controls for the three print color components, and then displayed upon a cathode ray picture tube. The system provides data on the amplification required for each of the three color components, and this data is readily convertible to print exposure control settings. In order for the individual color gain controls to accurately express the printing exposure time or intensity data, the non-linearity in the response of the photographic print paper as well as the non-linearity in response of the picture display cathode ray tube and other system components must be carefully compensated for.

Accordingly, it is another object of the present invention to provide an amplifier having an adjustable non-linear gain characteristic which is particularly well adapted to be employed as a non-linear element in an electronic color viewer for deriving color printing exposure information.

It is another aspect of the present invention to provide an improved electronic color viewer system incorporating an improved amplifier having an adjustable non-linear gain characteristic to precisely match the non-linear response of various color printing papers.

It is a further object of the present invention to provide improved electronic color viewer systems which may be rapidly and accurately changed in amplification gain characteristic response to accommodate for color printing papers having various different exposure contrast characteristics.

It is another object of the invention to provide an improved electronic color viewer which is particularly characterized by improved stability in relation to a zero optical input level.

Another object of the present invention is to provide a carefully calibrated and regulated electronic color viewer in which the color balance adjustments serve as accurate print timing information for the control of photographic color printing apparatus.

Further objects and advantages of the invention will be apparent from the following description and the accompanying drawings.

In carrying out the invention in one preferred embodiment thereof, there may be provided an adjustable gain characteristic amplifier including a controllable current carrying device having a control electrode and first and second current carrying electrodes. A first load impedance is connected in series with the first current carrying electrode and a second load impedance is connected in series with the second current carrying electrode. The usable output voltage of the amplifier is taken at the first current carrying electrode. The second load impedance includes a voltage divider having a connection to provide a negative feedback signal to the control electrode to maintain the voltage gain across the second load impedance linear with respect to input signals. The second load impedance includes at least one amplifier characteristic slope adjustment circuit connected in parallel with the voltage divider and having a diode and a variable resistor connected in series to a separate adjustable regulated voltage source. The adjustment of the adjustable voltage source is effective to determine the voltage level of the second current carrying electrode at which the diode changes conductivity between a forward biased conductive condition and a back-biased non-conductive condition.

In accordance with another aspect of the invention, a new and improved electronic color viewer is provided including a flying spot scanner arranged to scan a photographic original. A photoelectronic pickup element is arranged to receive the scanning information and to generate electrical signals in accordance therewith. An improved video amplifier system incorporating the non-linear amplifier described in the preceding paragraph is provided to receive the electrical signals and connected to provide the amplified signals to a cathode ray picture tube for display of the pictorial information in accordance with the photographic original.

In a further aspect of the invention, an improved and simplified method is provided for adjusting an electronic color viewer to exactly match the contrast gain characteristics to the photographic contrast characteristics of any selected photographic print paper.

Figure 2:
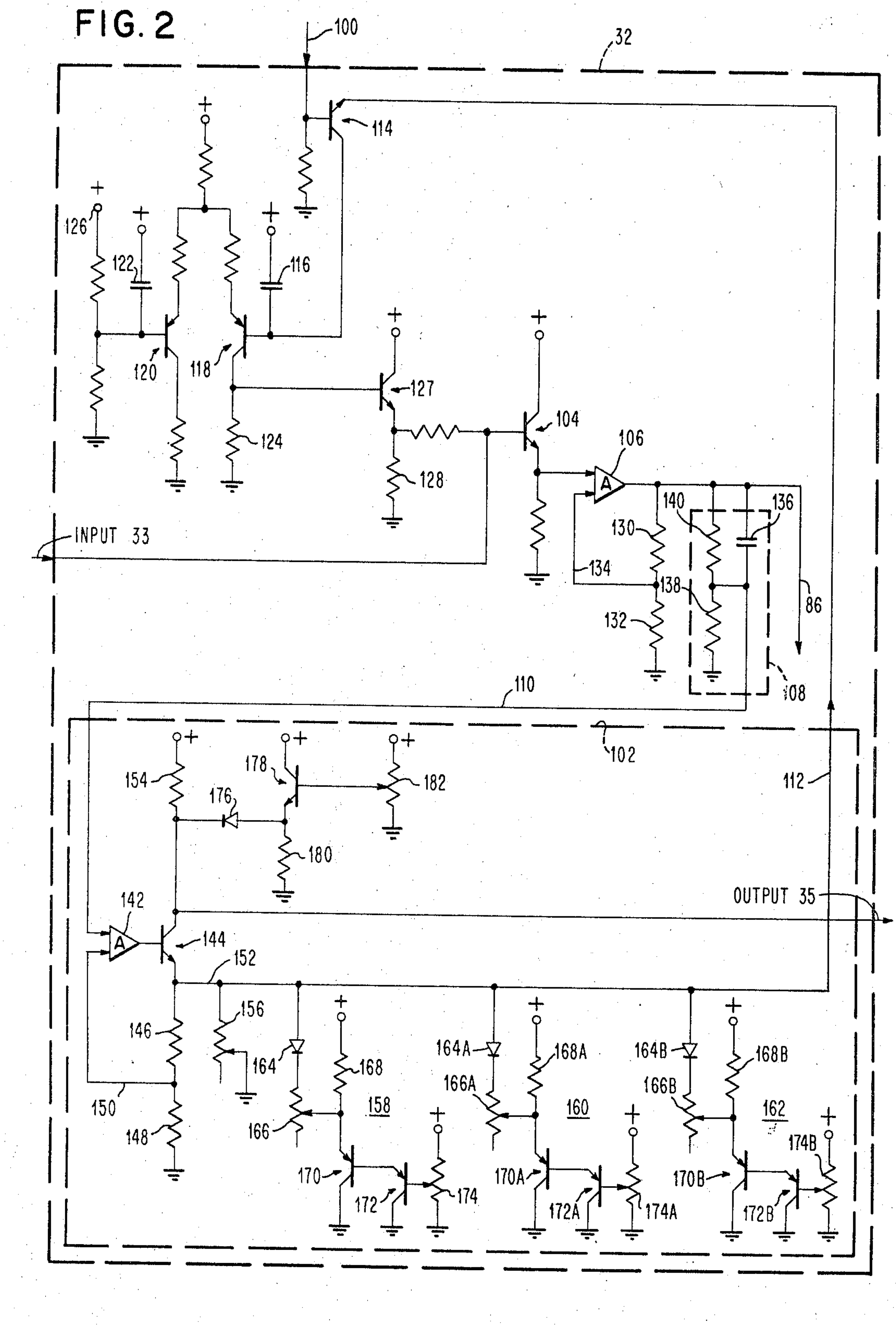
FIG. 2 is a schematic circuit diagram showing a preferred embodiment of a non-linear amplifier in accordance with the present invention and including circuit stabilization features in accordance with the present invention, all in a form especially suited to be incorporated as a part of the electronic color viewer system illustrated in FIG. 1.
Figure 3:
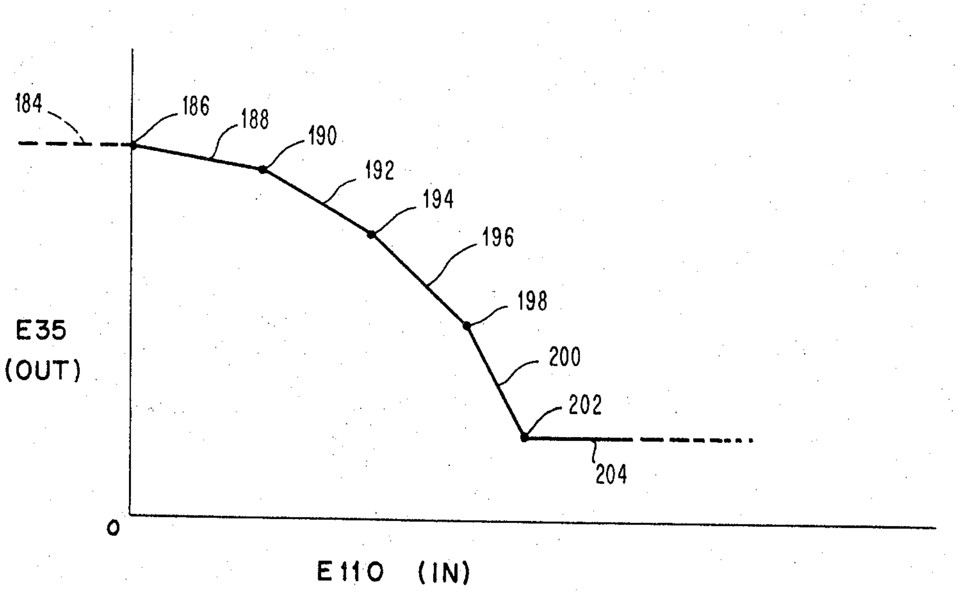

And FIG. 3 is a curve illustrating the derivation of a particular desired gain characteristic by a non-linear amplifier in accordance with the present invention, such as the non-linear amplifier of FIG. 2.

The operation of the non-linear amplifier of the present invention, as illustrated in FIG. 2 of the drawings, may be briefly described as follows:

The non-linear amplifier is illustrated in the box 102, and will be referred to below as the amplifier unit 102. It includes a transistor 144 which is operated under the control of a schematically illustrated amplifier 142. Transistor 144 is provided with a collector load impedance 154 and emitter load impedances 146 and 148 forming a voltage divider. The usable output voltage of the amplifier is taken at the collector connection 35. A negative feedback signal connection 150 is taken from the intermediate point of the voltage divider to the input of amplifier 142 in order to stabilize the output of transistor 144 as seen at the emitter connection 152 to be essentially proportional to the input at 110. The emitter impedance of transistor 144 also includes one or more slope adjustment circuits 158, 160, and 162 connected from the emitter connection 152 to ground. Each such slope adjustment circuit includes a diode 164 connected through a variable resistor 166 in series to a separate adjustable regulated voltage source such as the transistor 170, the voltage of which is determined by an associated cascade connected transistor 172 and the adjustment of an associated potentiometer 174. The adjustment of the voltage source represented by transistor 170 determines the voltage level of the emitter of transistor 144 at which diode 164 becomes conductive to thereby provide another shunt circuit to ground in the emitter circuit of transistor 144. This changes the gain characteristic slope of transistor 144 as seen at output connection 35 by changing the ratio of the collector load impedance 154 to the emitter load impedance.

A more detailed description of the construction and operation of the non-linear amplifier is given below in conjunction with a description of all of the features of FIG. 2.

*Color viewer system*

Figure 1:
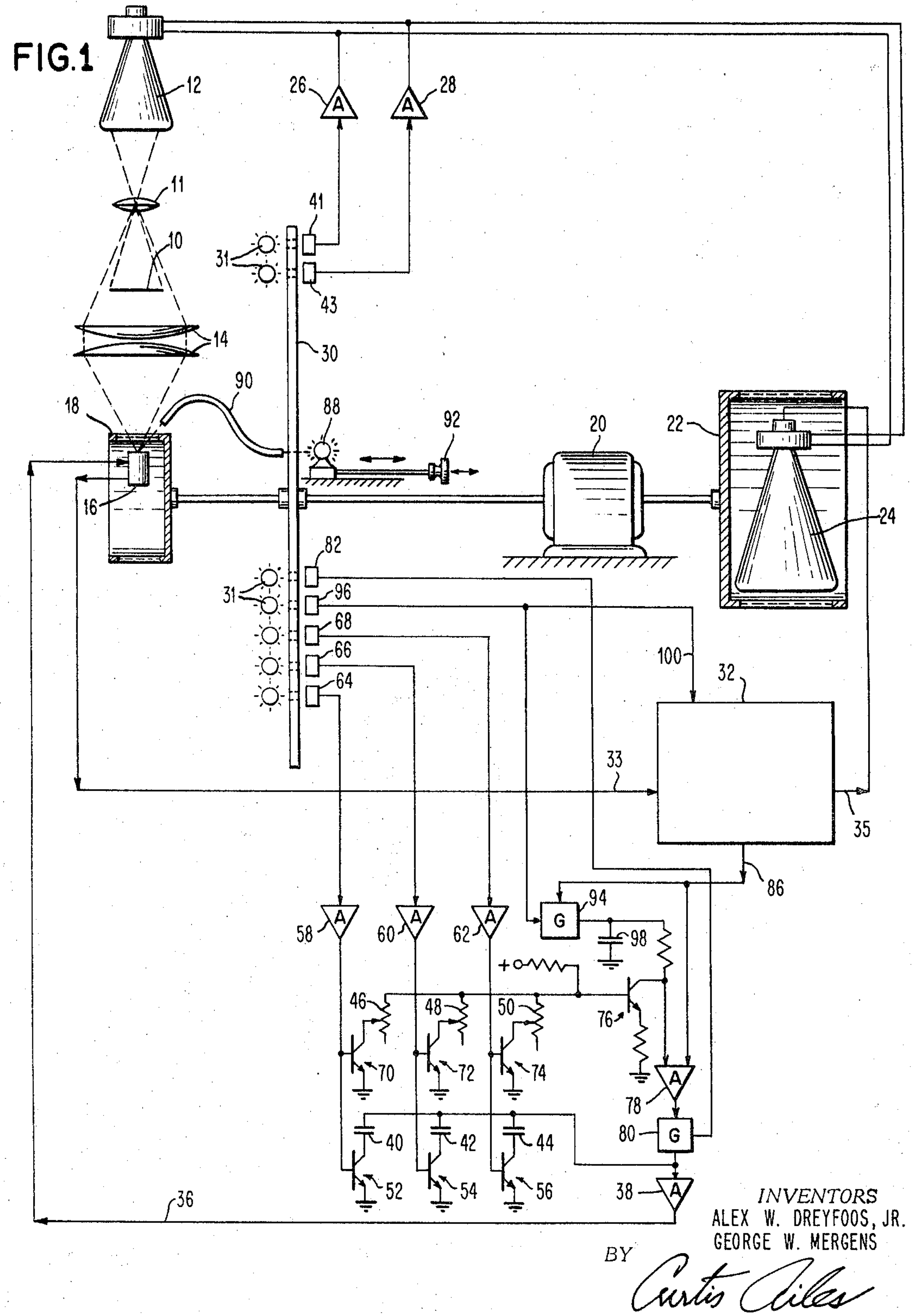
FIG. 1 is a simplified schematic representation of a preferred embodiment of an electronic color viewer in accordance with the present invention.

The operation of the color viewer system of the invention as illustrated in FIG. 1 may be briefly described as follows:

A color negative 10 which is to be viewed is scanned by a flying spot scanner 12, the beam being focused on the negative by an objective lens 11. The optical signals from the flying spot scanner 12, passing through lens 11, are focused by relay lenses 14 upon a photomultiplier tube 16. This illumination passes through a multiple color mask drum 18 which is rotated by a motor 20. A corresponding color masking drum 22 is also rotated in synchronism by the motor 20 for a picture tube 24.

Common sweep circuits including amplifiers 26 and 28 are provided for both the horizontal and vertical sweep signals for both the flying spot scanner 12 and the picture tube 24. The sweep signals for these common sweep circuits, and all of the other timing signals necessary for operation of the system are provided from a timing element 30 which is fastened to and rotates with the shaft of the motor 20. Thus, the timing is mechanically synchronized with drums 18 and 22. The timing element 30 is illustrated as a perforated disk which provides for the passage of light signals from lamps 31 through slotted perforations to various phototransistors for accomplishing the electrical timing function. The electrical picture signals picked up by the photo-multiplier tube 16 are transmitted through a connection 33, amplified in a non-linear fashion (gamma corrected) in an amplifier unit 32 before being supplied through connection 35 to the picture tube 24. The gain of the photo-multiplier tube 16 is controlled by the voltage to its dynodes supplied through connection 36 from the dynode amplifier 38. This gain is sequentially changed for each sequence of picture scans through the three different color masks in order to adjust the output to the requirements of the three color values recorded on the negative 10. These adjustments are accomplished by means of voltages stored upon the three capacitors 40, 42, and 44 which are sequentially switched to provide the input control voltage to the dynode amplifier 38.

The flying spot scanner 12 is a conventional cathode ray tube flying spot scanner, preferably of a type having a very short persistence white phosphor. The flying spot is imaged by the objective lens 11 upon the color negative 10. The condensor lens system, including lenses 14, focuses the aperture of lens 11 to substantially a spot on photo-multiplier tube 16. Each of the color mask drums 18 and 22 have twelve color mask frames arranged in four repeating sequences of red, green and blue filters. A different number of sequences can be provided if desired.

The timing disk 30 contains timing track apertures for the phototransistors indicated at 41 and 43 to control the horizontal and vertical sweep generators 26 and 28 to provide a separate cathode ray tube raster field each time one of the color filters of each of drums 18 and 22 is respectively positioned over the photo-multiplier tube 16 and the picture tube 24. Thus, the photo-multiplier tube 16 generates an electrical signal which is a record of the red transmission of the color negative 10 each time a red filter of the drum 18 is positioned in front of the photomultiplier tube. The following field generates a record of the green transmission of the color negative, and the next following field a record of the blue transmission of the color negative. This three-color sequence is repeated continuously and the resultant electrical signals are amplified and high-frequency peaked in the amplifier 32. The most important purpose for the high frequency peaking is correcting for phosphor persistence and aperture effects. Linearity corrections (gamma corrections) are made to the signal within amplifier 32 and the amplified and gamma corrected signal is then passed on to the picture tube 24. The linearity corrections are selected to compensate for the combination of the non-linearity in the responses of the display cathode ray tube 24 and the non-linearity in the color print material which the color negative would normally be printed onto, and in any of the other optical or electrical components between the negative 10 and the optical output to be viewed through the filters of drum 22.

In the signal path including amplifier 32, the polarity of signals is electrically reversed so that the picture represented by the color negative 10 can be viewed as a positive picture at the picture tube 24. This polarity reversal can also be referred to as a phase reversal since it means that an increasing optical energy signal received by the photo-multiplier tube 16 results in a decreasing illumination intensity output at the same instant from the display cathode ray tube 24, and vice versa.

The color recorded in the color negative 10 which is detected by the photo-multiplier tube when scanned through the red filter of drum 18 is called "cyan." This color is sometimes referred to also as "minus red," since it is the complement of red. The cyan image recorded on the color negative is for the purpose of recording the red image information. When scanned through the red filter, the variations of intensity of the cyan color on the negative are detectable by the photo-multiplier tube 16. The other two color components recorded on the color negative are magenta and yellow. The red filter essentially excludes variations in light intensity signals caused by the magenta and yellow color component signals of the color negative. The magenta color component of the negative records the green color information and is primarily detectable when scanned through the green filter of drum 18. Similarly, the yellow negative color is primarily detectable when viewed through the blue filter of drum 18. Each of the red, green, and blue filters of drum 18 is preferably chosen carefully so that the combined maximum pass band of the color spectrum formed by the combination of the illumination produced by the phosphor, the spectral sensitivity of the photo-multiplier tube, and the color filter, match the peak color absorption spectrum of the associated negative color. This should generally correspond to the peak of sensitivity of the color print material which is to be used to produce color prints. Matching the peak sensitivity of the color print material is actually the most important consideration. Thus, the green filter, in combination with the remainder of the system, should preferably match the sensitivity peak of the magenta layer of the color print material.

The color filters of the drum 22 are in exact phase and correspondence with the color filters of drum 18. Thus, whenever a red filter is presented before the photomultiplier tube 16, a red filter is also presented in front of the picture tube 24. This is proper because the red picture information is detected from the negative 10 while the negative is scanned through the red filter of drum 18, and this same red information is displayed at the same time at the picture tube 24. The selection of the exact spectral hues of the color filters of the drum 22 is not quite so important or critical to the operation of the apparatus as is the selection of the scanning filters for drum 18. The basic reason for this is that the color reproductions generally made from color negatives are of the subtractive color type whereas the apparatus being described is of the additive color type. Almost any set of red, green and blue filters in an additive system that yield a white color balance when the picture tube 24 is at a constant brightness, will give a higher degree of color purity than the best dyes available for a subtractive color system. However, where the apparatus is used for the particular purpose of determining color print exposure constants, careful selection of the hues of the display filters of the drum 22 may be employed to enhance the "match" between the calibration of the machine and the photographic properties of the color print materials.

Since the filter drum 22 for the picture tube 24 is continuously revolving, and does not stop for each color scan operation, the sweep of the picture forming cathode ray raster is preferably carried out in the same direction across the face of the picture tube 24 as the direction of progress of the color filters of the filter drum 22. Thus, for instance, the cathode ray deflection circuits provide for a single slow sweep across the face of the tube on one axis and a plurality of sweeps on the other axis to cover the area of the picture scan. Accordingly, the single slow sweep of the cathode ray spot is preferably carried out in the same direction across the face of the picture tube 24 as the direction of progression of the color filters. This assures that the color filter aperture will not interrupt part of the picture.

The gain of the system (which controls the density and color balance of the display) is individually adjustable for each of the three color fields by adjusting the gain of the photo-multiplier tube. The actual adjustments are accomplished by the three variable resistors 46, 48, and 50, by which the voltages upon capacitors 40, 42, and 44 are determined. Control of the gain of the system for this purpose is accomplished by controlling the input signals to the dynode amplifier 38 in a sequence corresponding to the colors, and in accordance with the voltages stored upon the capacitors 40, 42, and 44. The voltage thus provided by the dynode amplifier 38, through connection 36, controls the gain of the photo-multiplier tube 16. The sequential switching of the capacitors 40, 42, and 44 to control amplifier 38 is accomplished by the transistors 52, 54, and 56 under the control respectively of amplifiers 58, 60, and 62. These amplifiers are controlled by appropriate slotted timing tracks of the timing disk 30, through phototransistors 64, 66, and 68. These colors timing signals from amplifiers 58, 60, and 62 are also employed, through the medium of switching transistors 70, 72, and 74, to sequentially switch electrical signal values representative of the adjustments of the variable resistors 46, 48, and 50 through a transistor 76 to an amplifier 78. Signals based upon these adjustments are periodically gated from the output of amplifier 78 through a gate 80 to thereby vary the charge voltages upon capacitors 40, 42, and 44. The opening of the gate 80 is accomplished only during a short interval prior to each raster scan operation of the scanner 12 by another timing track of disk 30, and a phototransistor 82.

The amplifier 78 is a differential amplifier producing an output representing the difference between the signals derived from input transistor 76 and signals supplied through a connection 86 from the amplifier 32. The signal available to connection 86 from the video amplifier 32 is an amplified signal, but one which is not reversed in polarity (or phase), not high frequency peaked, and not gamma corrected. Furthermore, the output available at connection 86 during the brief interval when the gate 80 is opened is a very special signal. It is derived from an optical signal provided from a reference lamp 88 which shines through an aperture track of the timing disk 30 to an optical filament light pipe 90 which conveys the illumination to the photo-multiplier tube 16. The filter drum 18 includes a small color filter window arranged between each adjacent pair of main color filter windows through which the reference light from light pipe 90 passes on its way to photo-multiplier tube 16. The color of these auxiliary filters corresponds in each case to the next succeeding scanning filter color. The combination of the differential amplifier 78, which compares the signals determined by the settings of the color adjustment resistors 46, 48, and 50 with a standard illumination from a reference lamp 88, provides for a standardization and continued uniformity in the calibration of the apparatus. For this purpose, the output illumination of reference lamp 88 must be held constant. A satisfactory method for achieving this requirement is to employ an incandescent filament lamp, operating it at a carefully regulated voltage which is well below the voltage for which it is rated.

The illumination from the lamp 88 may be intentionally and controllably varied to accomplish a very useful result. Thus, the lamp may be physically moved either to the right or to the left, as illustrated in the drawing, to decrease or increase the illumination received at the light pipe 90, the movement being accomplished by means of a schematically represented handle 92. The useful result achievable by this adjustment is to vary the gain of the photo-multiplier tube 16, through the medium of the differential amplifier 78 and the dynode amplifier 38, on an overall basis for all colors, so as to vary the overall intensity of the picture as reproduced at the picture tube 24. Thus, the variation in the intensity of illumination from the reference lamp can be calibrated as another variable in producing color prints from the color negative 10. It will be understood, of course, that the illumination from reference lamp 88 may be varied in other ways in addition to physical movement of the lamp. For instance, a variable opacity mask may be adjustably positioned between the lamp 88 and the light pipe 90, or the lamp filament may be imaged on the light pipe with a variable aperture lens.

The outer boundary of the raster scan of the scanner tube 12 is preferably constricted on all four sides, either electrically, by reducing the beam intensity to essentially zero, or preferably by providing an opaque mask either upon or adjacent to the face of the flying spot scanner tube 12. This black border or "frame" around the picture is optically reversed with the colors by the electrical reversal of polarities within the system, and displayed as a white border for the picture at display tube 24. This white border provides a good optical reference for the viewer in evaluating the color qualities of the picture as it is viewed. This has been found to be a very valuable feature. This border signal also provides valuable optical and electrical reference level information for standardization, calibration, and stabilization of the system. For instance, at the end of each raster scan, when the flying spot scanner is blanked out by the border, there is a zero optical input to the photo-multiplier tube 16. Therefore, during this particular interval, the video amplifier 32 has an output which is particularly characteristic of a zero optical input condition. This particular output of amplifier 32 is gated from connection 86 through a gating device 94 under the control of another phototransistor 96 responding to an appropriate aperture timing track of disk 30. This signal through gate 94 is stored on capacitor 98 to serve as a standardized "white reference" voltage for the color control signals transmitted from the resistors 46, 48, and 50 through the transistor 76. The signal provided through gate 94 to capacitor 98 is referred to as a "white reference" signal because it corresponds to a white boundary of the display provided by picture tube 24.

The white reference gating signal from the phototransistor 96 is also supplied by a connection 100 to the amplifier 32 for stabilization purposes. This feature will be described more fully below in connection with FIG. 2.

If desired, additional apparatus may be provided for the system of FIG. 1 for alternate operation of the system in an integrated mode. In such operation, the system is standardized or calibrated to a signal representing the integrated values of the color adjustments for the three different colors, rather than to the illumination from the standardizing lamp 88. This feature is disclosed fully in the related patent application Ser. No. 453,144 of May 4, 1965, previously referred to above.

*Amplifier 32*

FIG. 2 illustrates the details of the amplifier 32. One of the principal features of amplifier 32 is the non-linear amplifier unit 102.

While amplifier 32 has been referred to above simply as an amplifier, or a video amplifier, it is actually an amplifier system incorporating a number of amplification stages, stabilization circuitry, a peaking network, and being particularly notable for the provision of a non-linear amplifier unit 102 which embodies some of the principal features of this invention particularly discussed at the beginning of this specification.

The signal which is received by the amplifier system 32, at connection 33, is amplified by a transistor 104, and an amplifier 106 to provide the amplified output at connection 86 which was referred to above in connection with the system of FIG. 1. The output at 86 is essentially a linear function of the input at 33.

The signal at 86 is also high frequency peaked in a peaking network 108, and provided through a connection 110 as the input to the non-linear amplifier unit 102. The non-linear output from unit 102 then appears at connection 35 from which it is supplied to the display picture tube 24 of FIG. 1.

An essentially linear component of the output of unit 102 is taken from a connection 112 and supplied to the emitter of a transistor 114. This signal is gated through the transistor 114 by the "white" gate signal coming in on connection 100 to the base of transistor 114. This signal gated through transistor 114 is employed to stabilize the operation of the entire amplifier system 32. It will be appreciated from the prior discussion that this stabilization signal is derived in terms of the amplifier system output at the "white" level signal interval by reason of the gating operation through connection 100. This signal level is stored and "remembered" in terms of a voltage upon a storage capacitor 116. This is used as one of the voltages to control the operation of a differential amplifier including transistors 118 and 120. The voltage on storage capacitor 116 is applied to the base of transistor 118 and is thereby compared in this amplifier with the voltage stored upon another capacitor 122 connected to the control base electrode of transistor 120. The resultant output appears across a load resistor 124 connected in the collector circuit of transistor 118 which thereby establishes a control bias for all of the succeeding stages of the amplifier system 32.

The bias signal appearing across resistor 124 is amplified in a transistor 127 and thereby applied across a load resistor 128 to be added to the input signal from connection 33 to transistor 104. A portion of the signal amplified by transistor 104 and amplifier 106 is fed back from a voltage divider including resistors 130 and 132, through a connection 134, to maintain the gain characteristic of amplifier 106 essentially linear.

Throughout the schematic circuit diagrams accompanying the present specification, power supply terminals are uniformly designated by a small circle and a plus sign symbol, as indicated at 126 for the charge control resistor for capacitor 122. It is understood that a standard conventional DC power supply source is connected to each of these terminals, and such source is not disclosed in detail in this specification. The other terminal of the power supply is connected to the common ground terminals which are indicated by the conventional ground symbol.

The peaking circuit 108 is essentially a high pass filter network including a voltage divider consisting of resistor 138 and resistor 140, and a high pass element consisting of capacitor 136 connected in parallel with resistor 146. As previously mentioned above, the output from the peaking circuit 108 is provided through connection 110 as the input to the non-linear amplifier unit 102.

When the amplifier system 32 is used in a viewer such as shown in FIG. 1, the peaking circuit 108 is particularly useful to compensate for the phosphorescent persistence on the flying spot scanner tube 12. This optically introduces an effect into the video amplifier system 32 which is similar to that which might be introduced by an electrical circuit designed to remove peaks. Thus, the phosphor persistence tends to reduce peaks, and the peaking circuit 108 reinstates those peaks.

*Non-linear amplifier 102*

The input signal to the non-linear amplifier unit 102 at connection 110 is amplified in an amplifier 142 and then supplied to an output stage including transistor 144. The output appearing at this stage on the collector connection 35 of transistor 144 is the gamma corrected output of the system. In the emitter circuit of transistor 144, a voltage divider is provided consisting of series connected resistors 146 and 148. The portion of the emitter voltage appearing across divider resistor 148 is fed back to the input of amplifier 142 through connection 150 to maintain the voltage of the emitter, at connection 152, as a substantially linear or proportional function of the input voltage signal at connection 110. This proportional relationship is maintained in spite of changes in the emitter load impedance which are described below. Connected to the collector of transistor 144, there is a collector load impedance including resistor 154.

Transistor 144 is selected to have a reasonably high gain so that the collector current and the emitter current are essentially equal. Therefore, the absolute value of voltage gain at any particular input voltage, as seen at the collector output connection 35, is essentially proportional to the ratio of the collector load impedance to the emitter load impedance. On the basis of the components described thus far, this is the ratio of the impedance of resistor 154 to the combined impedance of resistors 146 and 148. In accordance with an important feature of this invention, the emitter impedance (from connection 152 to ground) is changed in a controllable manner to thereby change the ratio of collector to emitter impedance, and to thereby change the gain characteristic of the amplifier. A variable resistor 156 is preferably provided from the emitter connection 152 to ground in order to accomplish an adjustment of the basic slope of the gain characteristic by adjustment of the emitter load impedance.

A plurality of automatic amplifier slope adjustment circuits 158, 160, and 162 are also provided between emitter connection 152 and ground to modify the emitter impedance. Each of these circuits includes a switching diode 164, a variable resistor 166 connected in series with diode 164, and a variable voltage source including the emitter-collector circuit of a transistor 170 having an emitter load impedance 168. The variable resistor 166 is connected to the emitter of transistor 170. The effective impedance of transistor 170 is controlled by another transistor 172 having its emitter connected to the control (base) electrode of transistor 170. The base electrode of transistor 172 is connected to the variable contact of a potentiometer 174 which is connected across the power supply. Thus, the adjustment of potentiometer 174 controls transistor 172 which in turn controls transistor 170 to determine the voltage and effective impedance of transistor 170.

The effective impedance of the emitter collector circuit of transistor 170 is essentially equal to the impedance of the potentiometer 174 between the variable contact and ground, reduced by the product of the reciprocals of the gains of the transistors 172 and 170. Thus, if the gain of each transistor is fifty, and if the effective portion of potentiometer 174 is 2,500 ohms, then the effective impedance of the emitter-collector circuit of transistor 170 is approximately one ohm. However, the voltage across transistor 170 may be a substantial fraction of the supply voltage, as determined by the setting of potentiometer 174. The transistor 170 and associated components therefore may be characterized as an adjustable regulated voltage source with a low internal impedance.

The operation of the automatic slope adjustment circuit 158 may be briefly described as follows: For all low level voltage inputs to amplifier 142, resulting in voltage levels at emitter connection 152 which are below the voltage level of the emitter of transistor 170, the diode 164 is non-conductive, and the slope adjustment circuit 158 is therefore not effective. However, for any higher signals resulting in a voltage level at connection 152 above the voltage of the emitter of transistor 170, diode 164 becomes conductive to change the gain slope characteristic of transistor 144 by the insertion of an additional shunt impedance in the collector circuit from connection 152 to ground. The total impedance of this new shunt circuit includes the variable resistor 166, and the parallel combination of resistor 168 and transistor 170, the resistor 168 being returned to ground through the power supply. However, resistor 168 may have a resistance in the order of 10,000 ohms, variable resistor 166 may have a minimum resistance in the order of 400 ohms, and the collector-emitter circuit of transistor 170 may have a resistance in the order of one ohm. Accordingly, the effective impedance of the new shunt circuit provided by the initiation of conduction of diode 164 is attributable almost entirely to the effective resistance value of variable resistor 166, and is almost entirely divorced from any important direct relationship to the impedance values of the other components of the slope adjustment circuit 158. In particular, the effective shunt impedance is substantially independent of the adjustment of the potentiometer 174. Since the adjustment of potentiometer 174 determines the voltage across the emitter-collector circuit of transistor 170, this adjustment determines the "cut-in" voltage for the commencement of conduction of diode 164. After cut-in, the adjustment of variable resistor 166 determines the new slope of the gain characteristic curve of the transistor 144. It is a very important and useful feature of the present invention that the adjustment of the cut-in point by adjustment of potentiometer 174 does not appreciably influence the adjustment of the slope as determined by the setting of variable resistor 166. However, an even more important consideration is that the cut-in potential is essentially completely independent of the current through diode 164 and variable resistor 166. If a simple resistor is employed in place of transistor 170, then the incipient commencement of conduction through diode 164 which provides a current through 170, would cause a greater voltage across 170 due to the increased conduction and IR drop to thereby keep the diode 164 from achieving full conduction. Therefore, the adjustment of the cut-in point would not be independent of the adjustment of variable resistor 166. With the present circuit, however, the cut-in point may be precisely adjusted by the adjustment of potentiometer 174, and this single adjustment may be relied upon to be fully effective regardless of later adjustment of variable resistor 166 in determining the new slope. It is quite apparent that instead of using a second transistor 172 to control the transistor 170, a single high gain transistor may be employed and controlled directly from the potentiometer 174. However, the arrangement shown is very satisfactory since it permits the use of two low gain inexpensive transistors at less cost and higher total gain than is available with a single high gain, high cost, transistor.

The construction and operation of the slope adjustment circuits 160 and 162 are substantially identical to that just described for circuit 158, and corresponding components are correspondingly lettered, but with the suffix letter A for the components of circuit 160, and with the suffix letter B for the circuit 162. By adjusting the potentiometers 174A and 174B for the commencement of conduction of diodes 164A and 164B at potentials different from one another and potentials different from the cut-in potential for diode 164, a series of slope changes in the voltage gain characteristic of transistor 164 may be accomplished to provide a very close approximation to any desired non-linear slope characteristic. A sequence of such adjustments is described in more detail below in connection with the curve of FIG. 3.

As the input signal on connection 110 goes more and more positive, and the resultant potential of emitter electrode connection 152 goes more and more positive, the collector-emitter current of transistor 144 is increasing. Therefore, the drop across collector load resistor 154 is increasing and the potential of output connection 35 is changing in a downward direction. In some systems, and particularly in the color viewer system illustrated in FIG. 1, it is very useful to provide an ultimate gain characteristic slope of zero at the maximum output portion of the gain characteristic. Accordingly, a zero slope circuit is provided including a diode 176, a transistor 178 having an emitter follower resistor 180, and a control potentiometer 182. The adjustment of potentiometer 182 controls the transistor 178 to determine the division of voltage across transistor 178 and its resistor 180. This sets the voltage on the right terminal of diode 176. When the negative going output at connection 35 achieves a value which is slightly below the potential of the right terminal of diode 176, then diode 176 becomes conductive and the conduction through transistor 178 and diode 176 maintains the output voltage on connection 35 at essentially a constant value despite any further increases in the level of the input signal on connection 110. At all values of potential at connection 35 which are more positive than the cut-in voltage of diode 176, the diode 176 is cut off and its associated circuitry has no influence upon the operation of the amplifier.

The non-linear amplifier unit 102 is illustrated as accomplishing a polarity (or phase) inversion. If the inversion is not desired, it is only necessary to add another amplfiier stage to accomplish another inversion. Furthermore, while an NPN type of transistor is illustrated, it is obvious that the polarities of the elements may be reversed, and a PNP transistor used instead. Furthermore, a different type of amplifying element such as a vacuum tube may be substituted, although it is not preferred.

FIG. 3 illustrates a typical voltage gain characteristic which may be achieved by the settings of the various adjustments of the non-linear amplifier 102. In FIG. 3, the output voltage E35 is plotted as the ordinant, and the input voltage E110 is plotted as the abscissa. The various values of these two voltages are not necessarily shown to the same scale in FIG. 3.

Before commencing adjustments of the system, potentiometer 182 is set very low, and each of the potentiometers 174, 174A, and 174B is set very high in order to keep the respective associated diodes cut off until adjustment of "cut-in" is desired.

For negative values of input voltage E110, conduction of transistor 144 is cut off, and therefore the slope of the gain curve is zero as indicated by the dotted section at 184. In the system of FIG. 1, this portion of the gain curve is not actually used. At about a zero value of input voltage, as indicated at point 186, conduction in the collector-emitter circuit of transistor 144 begins, and a definite change in slope is provided through a section of the gain curve indicated at 188. The value of this slope is determined by adjustment of variable resistor 156 which controls or "trims" emitter load resistance provided by resistors 146 and 148.

When point 190 is reached, and it appears that another change in slope is required, the adjustment of potentiometer 174 is lowered to cause the first initiation of conduction in the associated diode 164. The input voltage E110 is then raised further, placing the operation of the amplifier on a new slope section 192. The actual slope of the section 192 may be adjusted by varying the adjustment of variable resistor 166. This adjustment is made to match this section of the gain characteristic to a desired value.

In a similar manner, when point 194 is reached, the adjustment of potentiometer 174A is lowered to initiate conduction in diode 164A, and then the variable resistor 166A is adjusted to determine the slope of the next section 196 of the gain characteristic curve. Next, the adjustment of potentiometer 174B determines the position of point 198, and the adjustment of resistor 166B determines the slope of section 200. When point 202 is reached, and it is apparent that the output signal E35 should change no further for further increases in the input signal E110, then the adjustment of potentiometer 182 is raised to the point which just initiates conduction of diode 176, and from this point on, the output voltage E35 is determined by the voltage set by transistor 178, and the current provided from this transistor through diode 176. This is shown in FIG. 3 as the horizontal curve section 204. If a horizontal characteristic section such as 204 is not required for a particular application, the diode 176 and the associated apparatus including transistor 178 may be omitted from the amplifier, or may be kept switched off by maintaining the adjustment of potentiometer 182 at a low value such that diode 176 never turns on.

From the above explanation, it will be appreciated that the various adjustments of the non-linear amplifier 102 may provide for virtually any amplification characteristic, or a reasonable approximation of such a desired characteristic.

The system as illustrated contemplates only increases in the gain of the system by the successive switching on of diodes 164, 164A, and 164B. However, it is quite apparent that it is only necessary to reverse one of the diodes such as 164 in order to modify the slope change circuit such as 158 to cause a decrease in slope rather than an increase in slope as the switching point of its diode is reached. In such an arrangement, the reversed diode 164 would be initially conductive and the variable resistance 166 would be effective in the emitter circuit along with variable resistance 156 to determine the initial slope of the gain characteristic. As soon as the emitter potential at 152 was raised high enough to shut off the reversed diode 164, the slope of the gain characteristic would be reduced by reason of the resultant increase in resistance of the emitter circuit.

It is apparent that in many instances, a reasonable approximation of a desired gain characteristic may be achieved with only a single automatic slope changing circuit such as 158, and in other instances even more than three such automatic slope changing circuits may be required. Accordingly, a more eleborate system might include a number of additional slope changing circuits, and including a number of slope decreasing circuits as just described above, as well as the slope increasing circuits illustrated. The slope adjustment circuits 158, 160, and 162, and any additional such circuits which may be provided are normally adjusted to "cut-in" at various different points which are appropriately spaced apart as illustrated in FIG. 3. However, it will be understood that if the desired gain characteristic requires a very sharp transition, some of these points may be very closely spaced together. They may even be adjusted to coincide with one another where a very steep and abrupt change in slope is required.

The precise procedure employed, and the source of signals used to determine the settings of the various adjustments in non-linear amplifier 102 in order to achieve the curve such as illustrated in FIG. 3 will depend very much upon the nature of the signals of the system in which the non-linear amplifier is employed. When the non-linear amplifier 102 comprises a part of the color viewer shown and described in FIG. 1, the output 35 is connected to the cathode of the picture tube 24. The input voltage E110 is then adjusted to approximately a zero value at which the maximum positive output is obtained corresponding to point 186 on FIG. 3. The voltages of the control grids of tube 24 are then adjusted so that the cathode ray beam is just extinguished. The input signal E110 is then raised to a value which should produce a dark gray picture color. Variable resistor 156 is then adjusted until the picture tube 24 displays the proper shade of dark gray. The adjustment of the input voltage E110 to a point which should produce a dark gray picture is preferably accomplished by placing a negative 10 in the system of FIG. 1 which has light transmission properties corresponding to a dark gray positive picture. The proper adjustment of the variable resistor 156 is then achieved by comparing the display gray color on picture tube 24 with a standard gray picture to establish a proper correlation between the "dark gray" input, and the required "dark gray" output. The comparison establishes the slope of the gain characteristic section 188 in FIG. 3. Negatives corresponding to successively lighter grays are then employed to provide successively increasing input voltages E110, and the next time it appears that a change in slope is required, potentiometer 174 is adjusted to establish the cut-in point 190 for diode 164. As a lighter gray signal is approached, the slope of curve section 192 is appropriately adjusted by adjustment of variable resistor 166. This procedure is repeated successively to choose the points 194 and 198, and the slopes of 196 and 200. Finally, when the output signal appears to be virtually white, and it appears that no further change in the negative can provide a signal which will produce a new change in contrast, then the potentiometer 182 is set to cut in the diode 176 and to determine the level of the zero gain curve section 204.

The above method may be used to exactly match the gain characteristic of the entire system to the color printing characteristics of a particular print paper. This may be done by taking a gray scale negative having a series of "patches" corresponding to different degrees of gray, and making a print of this negative on the color print paper for which the system is to be calibrated. This print is made at an exposure time which is regarded as an average or normal value. This negative is then used in the system to provide the input signals just mentioned above, and the developed positive print of this negative is used for purposes of comparison with the different grays displayed upon the picture tube 24 as the system is adjusted. In this manner, the response of the color viewer to different contrast levels may be very precisely adjusted to give virtually a perfect match with the corresponding response of the print paper to the same negative. Thereafter, the system may be employed with confidence in deriving print calibration information which is very accurately related to the response of the print paper.

While a single negative having various "patches" of gray is a very useful tool, it is possible to also employ a series of negatives having different gray scale values as long as the standard prints are all printed to exactly the same exposure time. Furthermore, it is possible to obtain these adjustments using an actual picture negative and relating the various different adjustments to parts of the picture having different intensity values. However, the use of the gray scale standards is a convenience as it simplifies the procedure very considerably.

The maximum gain level characteristic illustrated by the horizontal curve section 204 in FIG. 3 is extremely important in the electronic color viewer system, of FIG. 1, particularly when that system is employed to derive print exposure information. For extremely low-level optical input signals corresponding to a very dark negative, and a very light print level, a serious problem is encountered in making the print paper distinguish between a very light gray which is almost white, and white itself. The print papers generally have a rather high degree of what may be characterized as "inertia" at the low printing light levels corresponding to a condition of almost white in the positive picture. Thus, a considerable exposure at this illumination level is necessary before any information is recorded on the print. This characteristic of the print paper is accurately simulated by the zero gain section of 204 of the curve of FIG. 3 which is provided by diode 176 and transistor 178 and the associated apparatus.

It will be appreciated that the accurate reproducability of switching of the various non-linear components of the non-linear amplifier 102 depends entirely upon the reproducability of the voltage levels to be observed at the emitter connection 152 of transistor 144. Accordingly, it is very important to stabilize the entire amplifier system 32. For this purpose, the feedback connection 112 through the gate transistor 114 to the differential amplifier including transistors 118 and 120 is very important to the successful operation of the system.

While the non-linear amplifier 102 has been described in the present specification in connection with a color viewer system, it is obvious that it is also useful in black and white exposure measurement systems as well as for systems of other types. However, the determination of proper exposure for printing is not nearly so critical for black and white systems.

While this invention has been shown and described in connection with preferred embodiments, it is apparent that various changes and modifications, in addition to those mentioned above, may be made by those who are skilled in the art without departing from the basic features of the invention. Accordingly, it is the intention of the applicants to protect all variations and modifications within the true spirit and valid scope of this invention.

What is claimed is:

1. An adjustable gain characteristic amplifier comprising a controllable current carrying device having a control electrode and first and second current carrying electrodes, a first load impedance connected in series with said first current carrying electrode, a second load impedance connected in series with said second current carrying electrode, the usable output voltage of said amplifier being taken at said first current carrying electrode, said second load impedance including at least one parallel connected amplifier characteristic slope adjustment circuit, each of said slope adjustment circuits comprising a diode and a variable resistor and a separate adjustable regulated voltage source connected in series circuit relationship, the adjustment of said adjustable voltage source being effective to determine substantially independent of the adjustment of said variable resistor a stable diode bias voltage level, said diode bias voltage level being operable to determine the discrete amplifier input signal-derived voltage at said second current carrying electrode at which said diode changes conductivity between a forward biased conductive condition and a back-biased non-conductive condition, the combined impedances of the elements of said slope changing circuit being effectively connected in parallel in said second load impedance circuit during conduction of said diode to thereby determine the slope of the gain characteristic of said amplifier, said last-mentioned slope of said gain characteristic being adjustable by adjustment of said variable resistor and substantially independent of the adjustment of said voltage source.

2. An adjustable gain characteristic amplifier in accordance with claim 1 in which said second load impedance comprises a voltage divider, and a connection from an intermediate point on said voltage divider to provide a negative feedback signal to said control electrode to maintain the voltage gain across said second load impedance linear with respect to input signals to said control electrode regardless of changes in the total value of said second load impedance.

3. An adjustable gain characteristic amplifier in accordance with claim 1 in which there is provided a zero slope circuit connected to said first current carrying electrode, said zero slope circuit comprising a diode and a separate regulated adjustable voltage source connected and arranged to switch on conduction in said diode at a high current level in said first current carrying electrode beyond which no further change in output voltage is desired.

4. An amplifier in accordance with claim 1 in which the diode of said slope adjustment circuit is connected in a polarity relationship to be forward biased to provide conduction during low amplitude input signals and to be back biased and cut off for high amplitude input signals to thereby cause a decrease in gain characteristic slope in the transition from low amplitude to high amplitude input signals.

5. An adjustable gain characteristic amplifier in accordance with claim 1 in which said diode of said slope adjustment circuit is connected with a polarity such as to be back biased and essentially cut off for low amplitude input signals, and forward biased and turned on for high amplitude input signals so as to provide a change to a steeper gain characteristic slope in the transition from low amplitude to high amplitude input signals.

6. An amplifier as set forth in claim 1 in which the internal impedance of said adjustable regulated voltage source is very low in relation to the impedance of said variable resistor so that said combined impedance of the elements of said slope changing circuit when said diode is conductive is essentially equal to the resistance of said variable resistor.

7. An amplifier in accordance with claim 1 including a plurality of said slope adjustment circuits, at least one of said slope adjustment circuits being a slope increasing circuit having its diode back biased for low amplitude input signals and forward biased for high amplitude input signals.

8. An amplifier in accordance with claim 1 in which said controllable current carrying device is a transistor, and including at least one amplifier stage connected ahead of said transistor to provide an amplified signal to said control electrode.

9. An amplifier in accordance with claim 8 in which said separate adjustable regulated voltage source of said slope adjustment circuit comprises a high gain transistor circuit having a low effective internal impedance.

10. An amplifier in accordance with claim 9 in which said high gain transistor circuit comprises two transistors connected in cascade with a potentiometer arranged to adjust the input of the first of said cascade connected transistors to thereby adjust the output voltage of said regulated voltage source.

11. An amplifier in accordance with claim 8 including a plurality of amplifier stages connected ahead of said transistor, said plurality of stages including a differential amplifier, a feedback connection from said second current carrying electrode to said differential amplifier to provide a system bias control for stabilizing the operation of said amplifier, and switching means and storage means for intermittently switching said feedback signal and storing said feedback signal at operating periods representative of a stable system input condition for establishing the appropriate stabilization level.

12. An amplifier in accordance with claim 11 including a peaking circuit between two of said amplifier stages preceding said transistor.

13. An electronic viewer for presenting a positive representation of pictorial information from a photographic negative comprising a flying spot scanner arranged to scan the negative, a photoelectronic pickup positioned to receive the scanning information, a video amplifier system connected to receive the signal from said pickup element, a cathode ray picture tube connected to receive the signal from said video amplifier system and to produce a positive picture corresponding to the pictorial information from said negative, said video amplifier system including an adjustable gain characteristic amplifier which is capable of adjusting the video amplifier gain to precisely match the response of the viewer system to various contrast signals with the response characteristics of any photographic print paper, said adjustable gain characteristic amplifier comprising an adjustable gain characteristic amplifier including a controllable current carrying device having a control electrode and first and second current carrying electrodes, a first load impedance connected in series with said first current carrying electrode, a second load impedance connected in series with said second current carrying electrode, the usable output voltage of said amplifier being taken at said first current carrying electrode, said second load impedance including at least one parallel connected amplifier characteristic slope adjustment circuit, each of said slope adjustment circuits comprising a diode and a variable resistor connected in series to a separate adjustable regulated voltage source, the adjustment of said adjustable voltage source being effective to determine the voltage level of said second current carrying electrode at which said diode changes conductivity between a forward biased conditive condition and a back-biased non-conductive condition, the combined impedances of the elements of said slope changing circuit being effectively connected in parallel in said second load impedance circuit during conduction of said diode to thereby determine the slope of the gain characteristic of said amplifier, said last-mentioned slope of said gain characteristic being adjustable by adjustment of said variable resistor.

14. A system in accordance with claim 13 in which said viewer is a color viewer.

15. A system in accordance with claim 14 in which an opaque border is provided for every negative to be scanned to thereby provide a reference level signal within said video amplifier system, a timing device for producing a timing signal during one of the border scan portions of each scanning cycle, a differential amplifier included within said video amplifier system, gating means operable in response to said border timing signal for gating an output of said video amplifier during said border scan interval to said differential amplifier for stabilizing the operation of said video amplifier system and for thereby maintaining a constant reference level of operation thereof.

16. A system in accordance with claim 15 in which a peaking circuit is provided within said video amplifier system to compensate for phosphor persistence effects in said scanner.

References Cited

UNITED STATES PATENTS

| | | | |
|---|---|---|---|
| 3,023,369 | 2/1962 | Horowitz | 330—24 |
| 3,309,617 | 3/1967 | Lancaster et al. | 330—24 |
| 3,351,707 | 11/1967 | Dreyfoos et al. | 178—5.4 |

OTHER REFERENCES

IBM Technical Disclosure, vol. 5, No. 9, February 1963, p. 32.

ROBERT L. GRIFFIN, *Primary Examiner.*

RICHARD MURRAY, *Assistant Examiner.*

U.S. Cl. X.R.

178—5.4